July 3, 1951 J. BAILEY 2,559,386
MANUFACTURE OF LAY FLAT TUBING
Filed Oct. 27, 1948
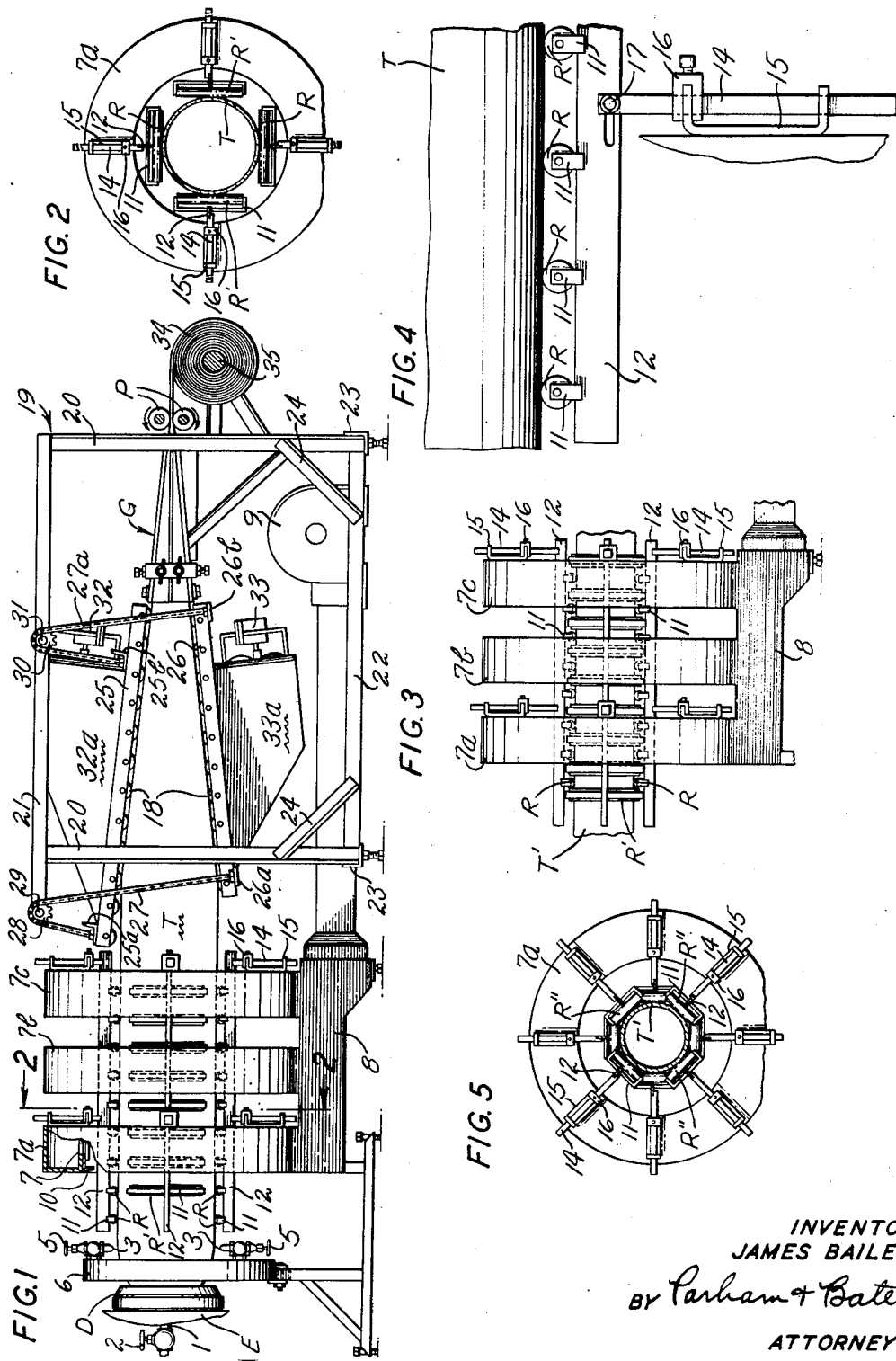
INVENTOR
JAMES BAILEY
BY Parham & Bates
ATTORNEYS Patented July 3, 1951

2,559,386

UNITED STATES PATENT OFFICE 2,559,386

MANUFACTURE OF LAY FLAT TUBING

James Bailey, West Hartford, Conn., assignor to Plax Corporation, West Hartford, Conn., a corporation of Delaware Application October 27, 1948, Serial No. 56,895

12 Claims. (Cl. 18—14)

The present invention relates to the manufacture of thin-wall tubing from thermoplastic materials in a plastic condition generally referred to as solvent-free. Polyethylene is an example of one such material which, under suitable temperature and pressure conditions, can be worked into desired shapes or objects without an excess of solvent and without a drying or curing step such as is necessary when an excess of solvent is employed to render the material plastic.

There is a large demand in the packaging and related fields for flexible plastic tubing having a wall thickness of a few thousandths of an inch and in widths, when collapsed, ranging from a few inches to several feet. Considerable difficulty has been experienced in the past in supplying this demand and, in particular, in satisfying the close tolerance requirements which include holding to uniform thickness and to uniform collapsed width.

In the manufacture of such tubing by the solvent-free extrusion of a heat softened thermoplastic, it is desirable to maintain air pressure within the tubing to prevent collapse and internal sticking and also to expand or draw down the tubing to a desired size which may be less or greater than the extrusion nozzle. Heretofore, it has been found extremely difficult to hold the tubing to the desired size because of the difficulty experienced in controlling temperature and internal fluid pressure, each of these factors being influenced in a large measure by the other.

It is an object of the present invention to provide a process of and apparatus for manufacturing collapsed thermoplastic tubing which overcome or substantially lessen the above-mentioned as well as other attendant difficulties.

A more specific object is to provide means for accurately sizing the tubing in which variations in temperature and pressure have a negligible effect.

Other objects and advantages will be apparent to those skilled in the art from the following description of the invention.

The process of the invention generally comprises extruding a hot, thin-wall plastic tubing, controlling the temperature of the tubing, expanding the tubing into contact with sizing rolls tangentially disposed in a series of spaced circles concentric with the tubing and cooling, setting and collapsing the sized tubing in a continuous operation.

In accordance with the invention, the sizing rolls are freely rotatable so that as they receive the tubing in a plastic condition and under a slight inflating pressure from the extrusion nozzle, there is no sliding action between the rolls and the tubing and a substantially frictionless sizing contact is maintained.

The rolls are located at equally spaced intervals in a circle about the tubing. The position of each roll may be adjusted so as to vary the size and shape to which the tube is inflated. A series of such rings or circles of rolls may be provided at spaced intervals so as to provide frictionless sizing and shaping restraint for the tubing until it has cooled and set against further plastic deformation by the inflating pressure.

Each ring of rolls may define the same shaping passageway for the tubing, or the several rings may define successively larger or smaller openings so as to provide for a gradual increase or decrease in the size of the tubing to a final size and shape.

Apparatus for performing the present invention is generally disclosed and described in the co-pending joint application Serial No. 38,606, filed July 14, 1948, now Patent No. 2,544,044 of Dalzell and Reber which is assigned to the assignee of this application.

For a more detailed description of the invention, reference is made to the attached drawings in which:

Figure 1 is a side elevation of apparatus for producing layflat tubing in accordance with the invention;

Fig. 2 is a cross-sectional view taken along line 2—2 of Fig. 1, and showing the arrangement of a circle of sizing rolls tangentially disposed and equally spaced about the tubing;

Fig. 3 is a side elevation of a portion of Fig. 1 showing a different arrangement of the sizing rolls suitably adjusted for sizing smaller diameter tubing;

Fig. 4 is an enlarged view of one of the roller assemblies shown in Figs. 1 and 3 with adjacent portions of the apparatus removed so as to clearly illustrate the adjustment features of the roller assemblies; and Fig. 5 is a view similar to Fig. 2 of a modified sizing roller assembly having a circle of eight instead of four sizing rollers adjustably disposed in overlapping relationship about the tubing.

Referring to Fig. 1 of the drawing, the illustrated embodiment of the present invention includes a tubing die D from which a thin-wall tubing T may be continuously extruded. A suitable extruder mechanism, which is fragmentarily shown at E, and which may include heating, homogenizing, and pressure producing parts or components, is provided for forcing a plastic material, such as polyethylene, through the die D under proper extrusion conditions of temperature, pressure and homogeneity.

Extending through the die D is a pressure line 1 controlled by a valve 2 through which a suitable fluid as, for example, air is introduced to maintain a desired pressure within the tubing T and expand it to a desired diameter.

The tubing T issuing from the die D is air cooled as it passes through a ring or circle of fishtail, gas-burner type, jets 3 which are mounted on a circular manifold 6. Manually operable needle valves 5 individually control the cooling air supplied to the jets 3 from the circular manifold 6 which is connected to a compressed air supply (not shown).

While for clarity of illustration only two of the jets 3 are illustrated in the drawings, in actual practice a much larger number, as for example, twenty, are provided at equally spaced intervals about the manifold ring 6. The air from the jets 3 reduces the temperature and, consequently, the plasticity of the extruded tubing. Differential regulation of the several jets serves to control uniformity of thickness of the blown tubing. Thus, when the tubing is blowing up unevenly and a thin streak develops, a little more air from the jet 3 overlying this particular streak gives additional chilling to that portion of the tubing. The additional chilling reduces expansion and thinning of the underlying portion and greater uniformity of thickness is obtained.

The tubing T next passes through a series of three annular wind boxes 7a, 7b, 7c which direct cooling air against the tubing. The several wind boxes 7a, 7b, 7c may be supplied with air under pressure of a few inches of water from a common manifold 8 and blower 9. The air thus supplied to the wind boxes may be discharged into contact with the tubing T through a series of openings 7 which may be located at spaced intervals in the inner perpheral wall of each wind box and individually regulated in size by sliding dampers 10 or comparable control valves.

A series of freely rotatable horizontal rolls R and vertical rolls R' are provided to support and control the size of the tubing. The rolls R and R' are arranged transversely of and tangentially to the periphery of the tubing in spaced circles which are coaxially disposed relative to the wind boxes 7a, 7b, 7c and, as so disposed, limit the diameter to which the tubing is blown, substantially as shown in Fig. 1 and Fig. 2.

The rollers R and R' are rotatably mounted at their ends in individual U-shaped bearing brackets or yokes 11 which are secured at their centers to four mounting strips 12. One of the mounting strips 12 supports all of the lower horizontal rollers R, and a second mounting strip 12 supports all of the upper horizontal rollers R. In like manner, all of the vertical rollers R' to the left of the tubing T (Fig. 2) are supported by the third mounting strip 12 and all of the vertical rollers R' to the right of the tubing T are supported by the fourth mounting strip 12. Each of the mounting strips 12 is adjustably secured at spaced points to the inner ends of its own pair of supporting rods 14 which extend radially from the tubing T. The rods 14 are slidably supported in individual bearing brackets 15 which, as shown in the drawings, are secured to the wind boxes 7a and 7c. As thus supported, the rods 14 may be moved radially inward or outward to enlarge or decrease the shape of the passageway defined by each of the several rings of rollers R, R'. Each of the rods 14 is provided with an adjustable fastener 16 (Fig. 4) for locking the rod in a desired position of adjustment.

Provision is also made for longitudinally adjusting each of the mounting strips 12 relative to its supporting rods 14. In the embodiment illustrated in Fig. 4, a slot and bolt connection 17 between the inner end of each rod 14 and its mounting strip 12 provides for this adjustment.

After passing through the wind boxes 7a, 7b, 7c and the frictionless restraining passageway defined by the rolls R and R', the tubing T is partially collapsed by a roller assembly, which includes a series of metal rollers 18 located transversely of the tubing along two converging lines above and below the tubing, substantially as shown and described in the U. S. patent application Serial No. 2,936 of Bailey and Reber, filed January 17, 1948, now Patent No. 2,529,897.

The tube collapsing roller assembly includes a frame, generally designated 19, having vertical corner posts 20 secured in spaced relationship by upper and lower longitudinal frame members 21 and 22 and by transverse spacing members 23. Corner braces 24 give the frame necessary rigidity. The rollers 18 are journalled in pairs of upper and lower longitudinal frame members 25 and 26, respectively, the upper pair of frame members 25 being secured in proper spaced relation by fore and aft transverse members 25a and 25b and the lower pair of frame members 26 being similarly secured by fore and aft transverse members 26a and 26b. The forward end of the roller frames 25 and 26 are supported by the ends of chains 27, the latter being supported by sprockets 28 secured at ends of a shaft 29 rotatably mounted in the forward ends of the members 21. Clockwise rotation (Fig. 1) of the sprockets 28 operates chains 27, so as to raise the forward end of the upper roller frame 25 and simultaneously lower the forward end of the lower roller frame 26 so as to enlarge the distance of the frame members 25 and 26 from the center line of the tubing T a like amount. As is apparent from the drawings, counter-clockwise rotation of the sprocket 28 reduces the distance between the upper and lower roller frame members 25 and 26 a like amount above and below the center line of the tubing T.

The aft ends of the frame members 25 and 26 are similarly supported and their positions adjusted by chains 27a which engage sprockets 30 secured to the ends of a transverse shaft 31 rotatably journalled in the longitudinal frame members 21.

In order to assure sufficient cooling of the tubing and thus prevent sticking to the rollers 18, additional cooling is provided by like upper and lower blowers 32 and 33 which, respectively are mounted on the upper and lower frames 25 and 26 and the air from which directed by suitable ducts 32a and 33a towards both upstream banks of upper and lower rollers 18 and the portion of the tubing engaged thereby.

From the rolls 18, the tubing T is drawn by a pair of driven pulling rolls P through a gusseting mechanism, generally designated G, which acts to further collapse the tubing and, at the same time, in cooperation with the internal fluid pressure introduced and maintained through the pressure line 1, forms tucks, plaits or gussets in the sides of the collapsing tube. For further details of the gusseting mechanism G, reference may be made to the co-pending joint U. S. patent application Serial No. 38,606 of Reber and Dalzell, filed July 14, 1948. From the pulling rolls P, the fully collapsed and gusseted tube is fed to and wound in a roll 34 upon a driven arbor 35 of a conventional winding mechanism (not shown).

During the operation of the apparatus heretofore described with reference to Figs. 1, 2 and 4, each of the several circles of rollers R, R', may define the same size opening for the tubing. It will be understood, however, that the several rings may define successively larger or smaller sizing openings so as to provide for a gradual increase or decrease in the size of the tubing T to a desired final shape and size. In either event, the rollers R, R' provide frictionless shaping restraint to a point where the tubing has cooled and set against further plastic deformation.

In the case of each circle or ring of rollers R and R', the axes of the rollers comprising the ring preferably are located in the same plane disposed at right angles to the axis of the tubing T. However, in the case of small diameter tubing T' (Fig. 3) where the length of the rollers R and R' make it impossible to adjust them in the same plane to define the required small diameter shaping opening, the rollers R may be spaced from the rolls R' so as to overlap one another in the manner shown in Fig. 3.

It will be appreciated that, in practicing the invention, the number of rollers R, R' arranged in each circle or ring and the number of such rings employed in a particular installation will be dependent upon the amount of sizing restraint necessary to prevent over-inflation of the tubing at any point. As an example, Fig. 5 shows eight rollers R'' arranged in a circle to tangentially engage and provide frictionless restraint at equally spaced points about the periphery of the tubing.

The rollers R'' alternately overlap and underlap each other so that, in defining the necessary small diameter restraining ring for the tubing T', they do not interfere with one another. However, when the rings of eight rollers R'' are employed to restrain larger diameter tubing, the mounting strips 12 and supporting rods 14 preferably are adjusted so as to locate all eight rollers R'' of a ring in the same plane.

The application of frictionless sizing restraint to the manufacture of tubing has greatly increased output.

As compared with similar processes without positive inflation restraint, a greater ratio of final tube diameter to extruded size at the die is obtainable.

Greater molecular orientation and greater uniformity in size and wall thickness is obtained with the present invention.

In accordance with the present invention, it is not necessary to continually regulate the inflating pressure within the tubing. Air or other inflating medium, is introduced through the line 1 and the control valve 2 is closed when the necessary pressure has been established in the portion of the tubing between the extrusion die D and the collapsing and pulling rolls P. Normally, no further adjustment of the valve 2 is required as the pressure medium captured in the inflated portion of the tubing serves to inflate the successively extruded tubing. However, if an appreciable change occurs in the inflating pressure, such as may result when pin holes occur in the tubing and air escapes, or for other reasons, it is necessary merely to open and then close the valve 2 when the necessary pressure is reestablished.

Small variations in the internal or inflating pressure within the tubing have little or no effect on the size of the tubing where the frictionless sizing restraint of the invention is employed and any tendency for wrinkles to occur in rolling the tubing is substantially eliminated.

Embodiments other than those illustrated for obtaining these and other advantages of the invention will occur to those skilled in the art and it, therefore, is to be understood that the described embodiments are merely illustrative and that the scope of the invention is defined by the following claims.

I claim:

1. The process of forming tubing of thermoplastic material which includes continuously extruding thermoplastic material through an annular die in the form of tubing, expanding successive portions of the tube by internal fluid pressure to a size other than the initial size of the tubing, and engaging the exterior of successive portions of the expanding tube with sizing means so as to limit the size to which the tube is expanded by internal pressure and moving the surface of the restraining sizing means which engages the tube at substantially the same rate as the rate of movement of the engaged tube.

2. The process of forming tubing of thermoplastic material which includes continuously extruding thermoplastic material through an annular die in the form of tubing, expanding successive portions of the tubing to a size other than its extrusion diameter by internal fluid pressure, engaging the exterior of successive portions of the tube with a restraining sizer and thereby limiting the size to which the tube is expanded, and moving the surface of the restraining sizer which engages the tube at substantially the same rate as the rate of movement of the engaged tube.

3. The process of forming thin-wall tubing of thermoplastic material which includes continuously extruding said material in a heated and plastic condition through an annular die in the form of tubing, establishing a greater internal than external fluid pressure on the tube as it is extruded in a heated, deformable condition from the die, expanding said heated portion of the tube by said pressure differential to a greater diameter, engaging the exterior of successive portions of the tube with restraining members, the engaged surfaces of which move at substantially the same rate as the rate of movement of the engaged tube.

4. The process of forming thin-wall tubing of thermoplastic material which includes continuously extruding said material in a heated and plastic condition through an annular die in the form of tubing, establishing a greater internal than external pressure on the tubing as it is extruded in a heated, deformable condition from the die, expanding said heated portion of the tubing by means of said pressure differential to a greater diameter, and positively determining the size to which the tubing is expanded by engaging the exterior of successive portions of the moving tube with a restraining sizer and limiting the size to which the tube is expanded, and moving the surface of the restraining sizer which engages the tube at the same rate as the rate of movement of the tube.

5. Apparatus for forming tubing of thermoplastic material including an annular die, an extruder for continuously extruding thermoplastic material from the annular die in the form of tubing, means for introducing fluid pressure into the tubing to blow successive portions of the tubing to a predetermined size larger than its extrusion diameter, and sizing means defining a passageway of the approximate size and shape of said larger expanded tubing through which the tubing travels in engagement therewith, said sizing means having a portion thereof which contacts the tube movable at substantially the same rate as the tube.

6. Apparatus for forming tubing of thermoplastic material including an annular die, an extruder for continuously extruding heated thermoplastic material from the annular die in the form of tubing, means for introducing fluid pressure into the tubing to blow successive portions of the tube to a size other than its extrusion diameter, means for defining a passageway for sizing the tube to said over-size by engaging and restraining said expanded tubing during travel of the tube therethrough, said sizing means including portions which engage and restrain expansion of the tube and are movable at substantially the same rate as the engaged tube.

7. Apparatus for forming tubing of thermoplastic material including an annular die, an extruder for continuously extruding heated thermoplastic material from the annular die in the form of tubing, means for drawing the tubing from the die, means for introducing fluid pressure into the upstream portion of the tubing to blow successive portions to a size other than its extrusion diameter, a ring of rollers tangentially defining a passageway differing in size and shape from the annular die and the extruded tubing for limiting the size to which the tubing is blown, and means for adjusting the location of the rollers to predetermine the size to which the tubing is expanded.

8. Apparatus for forming tubing of thermoplastic material including an annular die, an extruder for continuously extruding heated thermoplastic material from the annular die in the form of tubing, an adjustable roller assembly for collapsing the tubing, means for introducing fluid pressure into the upstream portion of the tubing to blow successive portions of the tubing to a size other than its extrusion diameter, a circle of independently adjustable rollers about the tubing intermediate the die and the collapsing roller assembly tangentially defining a passageway of the said other size of the tube for limiting the size to which the tubing is blown.

9. Apparatus as recited in claim 8 including means for adjusting the rollers radially relative to the tubing.

10. Apparatus as recited in claim 8 including means for adjusting the rollers longitudinally relative to the tubing so as to permit overlapping of the rollers in the circle about the tubing.

11. Apparatus for forming tubing of thermoplastic material including an annular die, an extruder for continuously extruding heated thermoplastic material from the annular die in the form of tubing, an adjustable roller assembly for collapsing the tubing, means for introducing fluid pressure into the upstream portion of the tubing to blow successive portions of the tubing to a size other than its extrusion diameter, a circle of independenly adjustable rollers about the tubing intermediate the die and the collapsing roller assembly for limiting the size to which the tubing is blown, and means for adjusting the rollers radially and longitudinally relative to the tubing to vary the circle they define and permit overlapping of the rollers.

12. Apparatus for forming tubing of thermoplastic material including an annular die, an extruder for continuously extruding heated thermoplastic material from the annular die in the form of tubing, means for drawing the tubing from the die, means for introducing fluid pressure into the upstream portion of the tubing to blow successive portions to a size other than its extrusion diameter, a sizing passage through which the tubing passes substantially frictionlessly comprising a series of spaced rings of rollers for limiting the size to which the tubing is blown, and means for adjusting the location of the rollers to vary the size of the several sizing rings which they define and provide for adjustment of a ring of rollers from positions in the same plane to overlapping positions in the spaced planes.

JAMES BAILEY.

REFERENCES CITED

The following references are of record in the file of this patent:

UNITED STATES PATENTS

| Number | Name | Date |
|---|---|---|
| 2,047,554 | Fischer | July 14, 1936 |
| 2,461,976 | Schenk | Feb. 15, 1949 |

FOREIGN PATENTS

| Number | Country | Date |
|---|---|---|
| 45,266 | France | Apr. 23, 1935 |
| 670,552 | Germany | Jan. 20, 1939 |

Certificate of Correction

Patent No. 2,559,386

July 3, 1951

JAMES BAILEY

It is hereby certified that error appears in the printed specification of the above numbered patent requiring correction as follows:

Column 6, line 56, after "tube" strike out the period and insert , *cooling said expanding material below its temperature of plasticity and thereby setting said expanded tubing.*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*